(12) United States Patent
Lucchi et al.

(10) Patent No.: US 9,630,646 B2
(45) Date of Patent: Apr. 25, 2017

(54) APPARATUS FOR PRESSING A RACK AGAINST A PINION OF A STEERING GEAR ASSEMBLY

(71) Applicant: TRW Automotive GmbH, Alfdorf (DE)

(72) Inventors: Marco Lucchi, Concesio (IT); Luca Tabaglio, Brescia (IT); Enrico Sarioli, Paderno Franciacorta (IT)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 14/414,523

(22) PCT Filed: Jul. 12, 2013

(86) PCT No.: PCT/EP2013/064795
§ 371 (c)(1),
(2) Date: Jan. 13, 2015

(87) PCT Pub. No.: WO2014/009530
PCT Pub. Date: Jan. 16, 2014

(65) Prior Publication Data
US 2015/0191197 A1    Jul. 9, 2015

(30) Foreign Application Priority Data

Jul. 13, 2012 (EP) .................................. 12005163

(51) Int. Cl.
*B62D 3/12* (2006.01)
*F16H 19/04* (2006.01)
(Continued)

(52) U.S. Cl.
CPC ............. *B62D 3/123* (2013.01); *F16H 19/04* (2013.01); *F16H 55/28* (2013.01); *F16H 55/283* (2013.01);
(Continued)

(58) Field of Classification Search
CPC . B62D 3/123; B62D 3/12; B62D 3/00; B62D 3/02; F16H 55/283; F16H 55/28;
(Continued)

(56) References Cited

U.S. PATENT DOCUMENTS 5,058,448 A * 10/1991 Kiyooka ............... B62D 3/123
384/420
5,660,078 A * 8/1997 Phillips ................. B62D 3/123
180/427
(Continued)

FOREIGN PATENT DOCUMENTS

DE    102008042134 A1    3/2010
DE    102009046304 A1 *  5/2011 ............. B62D 3/123
(Continued)

OTHER PUBLICATIONS

Screw thread. (May 25, 2011). In Wikipedia, the Free Encyclopedia. Retrieved 17:19, Sep. 7, 2016, from https://en.wikipedia.org/w/index.php?title=Screw_thread&oldid=430839369.*
(Continued)

*Primary Examiner* — William Kelleher
*Assistant Examiner* — Joseph H Brown
(74) *Attorney, Agent, or Firm* — MacMillan, Sobanski & Todd, LLC

(57) ABSTRACT

An apparatus for pressing a rack against a pinion of a steering gear assembly includes a housing, a support yoke slidably guided in the housing along an axis, a bearing element that is fixed to the housing in an axial direction, a first elastic element providing an axial load acting upon the support yoke and the bearing element to urge the support yoke against the rack, a wear-compensating abutment member coacting with the bearing element such that a relative rotation about the axis generates an axial displacement of the abutment member relative to the bearing element, and a (Continued)

separate, second elastic element providing a load acting upon the abutment member in a circumferential direction to urge the abutment member against the support yoke.

9 Claims, 5 Drawing Sheets

(51) Int. Cl.
F16H 57/12 (2006.01)
F16H 55/28 (2006.01)

(52) U.S. Cl.
CPC ....... F16H 57/12 (2013.01); *F16H 2055/281* (2013.01); *F16H 2057/127* (2013.01); *Y10T 74/19623* (2015.01)

(58) Field of Classification Search
CPC ....... F16H 2055/281; F16H 2057/2057; F16H 2057/127; F16H 57/12; F16H 55/26; Y10T 74/19623
USPC ...................................... 74/422, 388 PS, 409
See application file for complete search history.

(56) References Cited

U.S. PATENT DOCUMENTS

| | | | | |
|---|---|---|---|---|
| 5,746,285 A * | 5/1998 | Yonezawa | ............... | B62D 3/123 180/428 |
| 7,487,984 B1 * | 2/2009 | Lemont, Jr. | ............ | B62D 3/123 280/93.514 |
| 7,930,951 B2 * | 4/2011 | Eickholt | ................ | B62D 3/123 74/388 PS |
| 8,256,315 B2 | 9/2012 | Song | | |
| 8,418,576 B2 * | 4/2013 | Bareis | ..................... | B62D 3/123 74/409 |
| 8,465,034 B2 * | 6/2013 | Heo | ........................ | B62D 3/123 280/779 |
| 8,752,445 B2 | 6/2014 | Bareis et al. | | |
| 2008/0295629 A1 | 12/2008 | Song | | |
| 2009/0223314 A1 | 9/2009 | Eickholt | | |
| 2009/0263206 A1 * | 10/2009 | Hirose | .................. | B62D 3/123 411/90 |

FOREIGN PATENT DOCUMENTS

| | | | | | |
|---|---|---|---|---|---|
| DE | 102010029603 A1 * | 12/2011 | ............ | B62D 3/123 |
| DE | 102010039202 A1 * | 2/2012 | ............ | B62D 3/123 |
| EP | 1086880 A2 * | 3/2001 | ............ | B62D 3/123 |
| FR | 2857929 A1 * | 1/2005 | ............ | B62D 3/123 |

OTHER PUBLICATIONS

International Search Report, Application No. PCT/EP2013/064795 dated Oct. 9, 2013.
European Extended Search Report, Application No. EP 12005163 dated Dec. 20, 2012.
Notification of First Chinese Office Action, Application No. 201380037281.1 dated Jan. 12, 2016.
Notification of Second Chinese Office Action, Application No. 201380037281.1 dated Aug. 26, 2016.

* cited by examiner

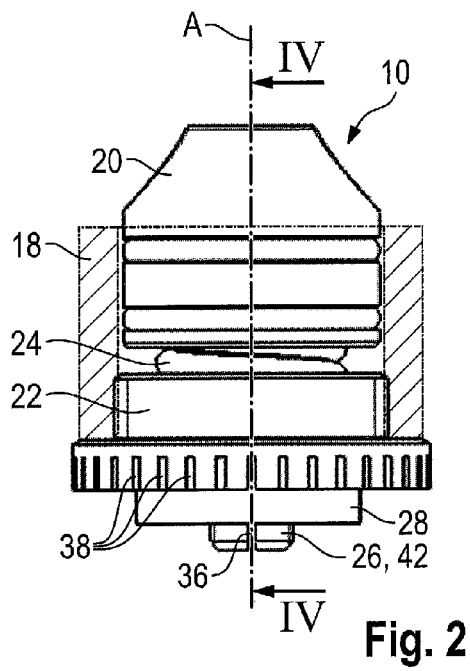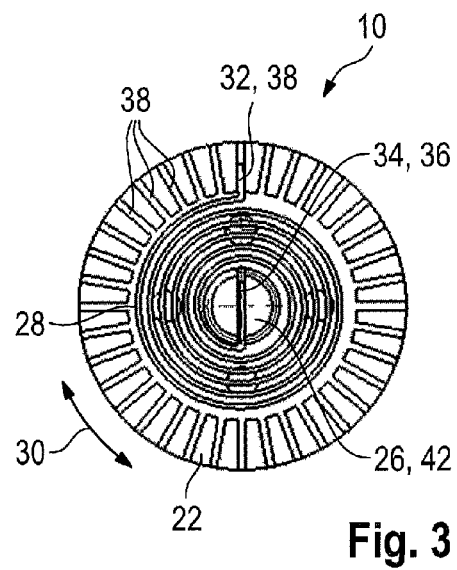
Fig. 2
Fig. 3
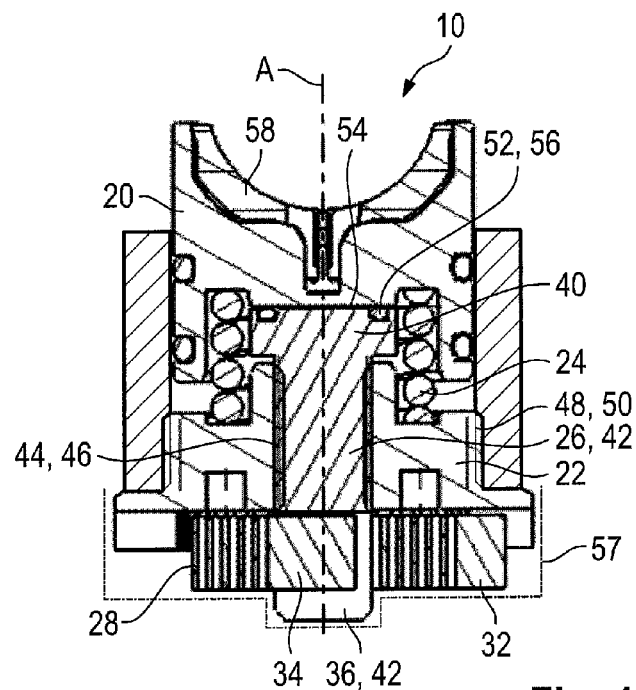
Fig. 4

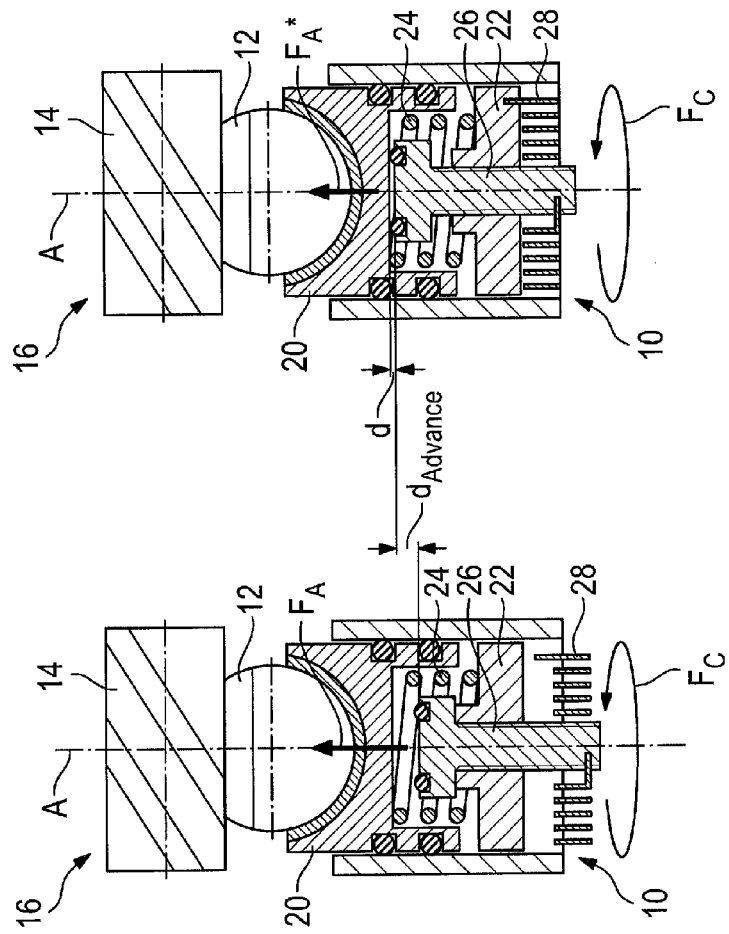
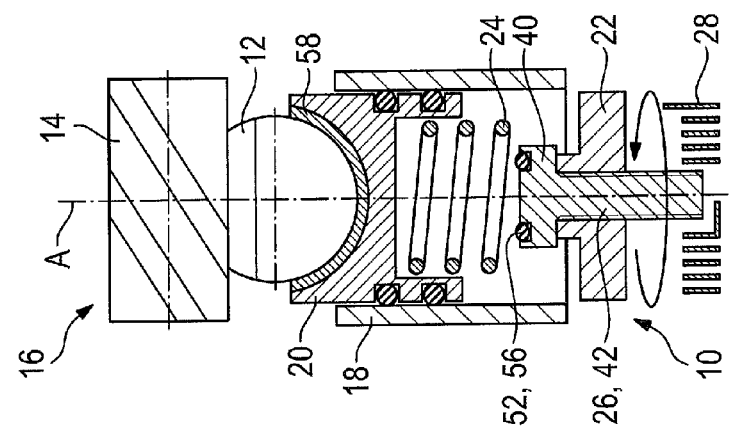

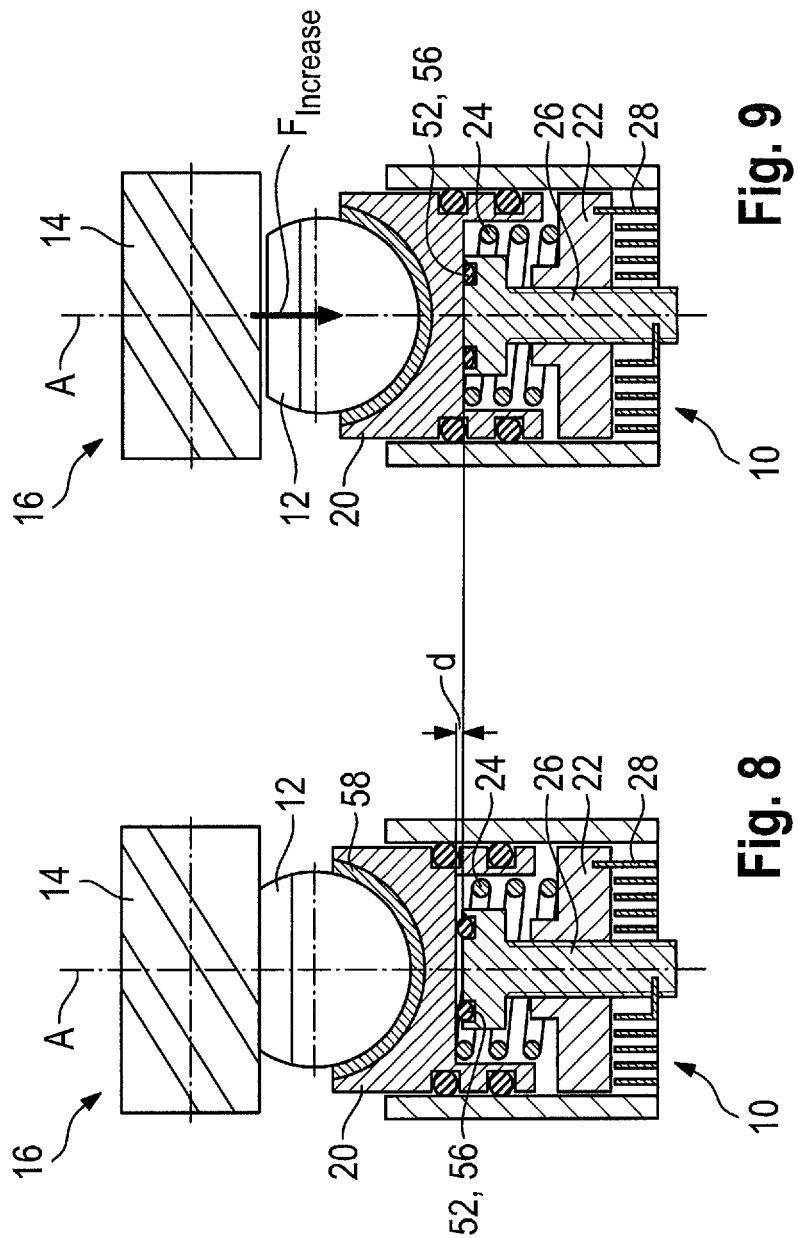

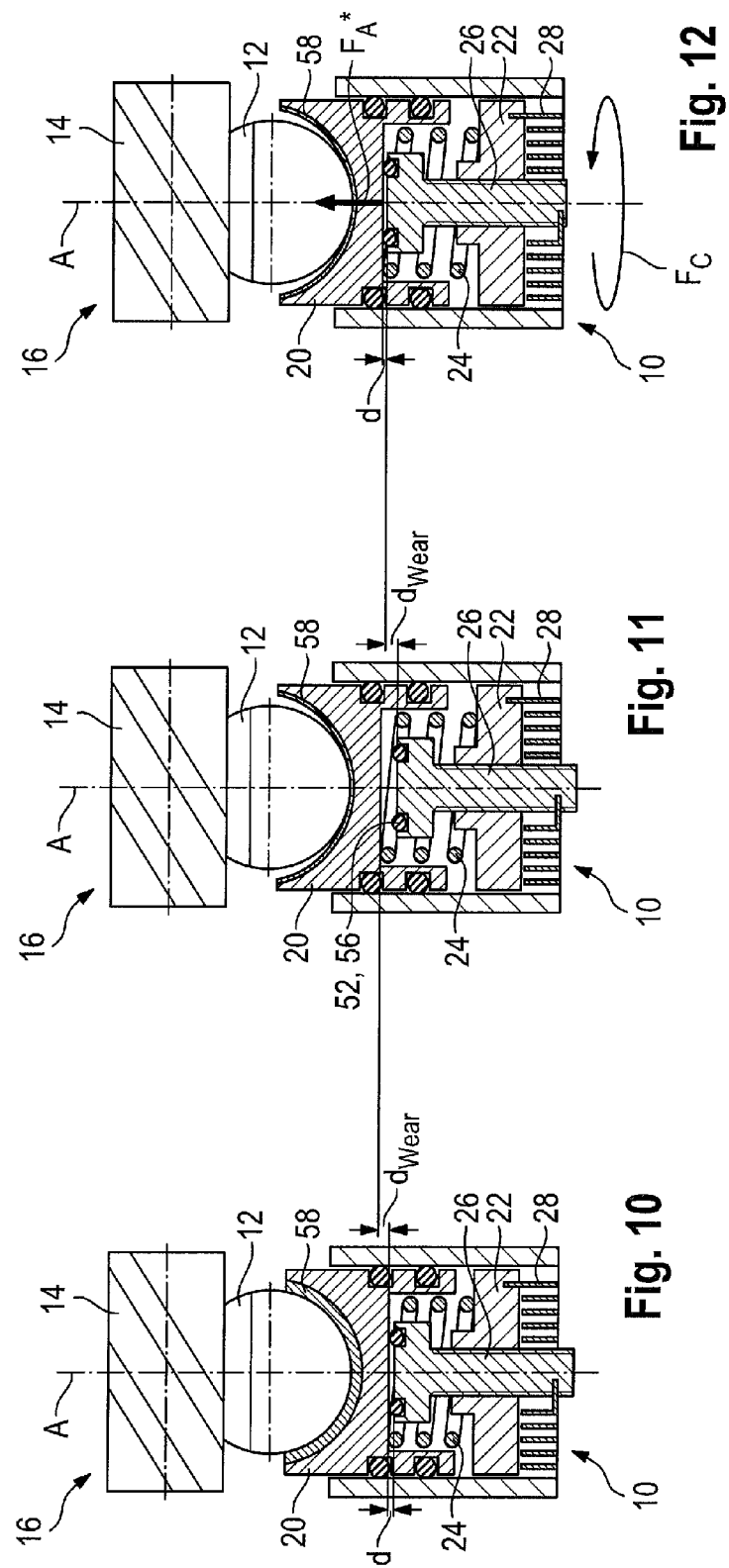

APPARATUS FOR PRESSING A RACK AGAINST A PINION OF A STEERING GEAR ASSEMBLY

CROSS-REFERENCE TO RELATED APPLICATIONS

This application is a national stage of International Application No. PCT/EP2013/064795 filed Jul. 12, 2013, the disclosures of which are incorporated herein by reference in entirety, and which claimed priority to European Patent Application No. EP 12005163.6 filed Jul. 13, 2012, the disclosures of which are incorporated herein by reference in entirety.

BACKGROUND OF THE INVENTION

The invention relates to an apparatus for pressing a rack against a pinion of a steering gear assembly.

Rack-and-pinion steering systems for motor vehicles are well-established state of the art in various embodiments. Because of their functional principle, all rack-and-pinion steering systems include a steering gear assembly with a rack and a pinion wherein the pinion and a toothed portion of the rack form intermeshing gears. A rotational force applied via a steering wheel on a steering shaft and the pinion is transformed by the steering gear assembly into an axial force of the rack and remitted to steerable wheels of the motor vehicle. Nowadays, the rack-and-pinion steering systems are usually designed as hydraulic, electro-hydraulic or electric power-steering mechanisms supporting a driver during steering operation.

Since considerable forces occur in the steering gear assembly occasionally, it was realized soon that special provisions have to be made in order to keep the rack and the pinion in an engagement substantially free of play or backlash. Otherwise, there is a risk that the rack moves away from the pinion by a deformation transverse to its longitudinal direction when a load is applied. This would lead to an undesirable increasing backlash at least and, in an extreme case, even to a slip in the steering system.

In order to prevent such steering behavior, a support yoke is usually provided near the pinion, this support yoke providing a pressure force as constant as possible to urge the rack against the pinion. The greatest challenges for such yoke are that the designated pressure force is kept as constant as possible, a compensation of wear due to sliding friction between the support yoke and the rack during steering operation and an avoidance of disturbing rattle noise during motor vehicle operation.

In order to provide an improved steering gear assembly that inhibits the development of rattle even after the rack and the pinion have been subjected to wear, U.S. Pat. No. 7,930,951 B2 suggests a rack-and-pinion steering gear with a self-adjusting rack bearing. Therein, a compliance zone allowing the support yoke to move in response to dimensional variations in the pinion shaft and the rack during operation of the steering gear assembly should be kept as constant as possible by screwing a first adjustment member towards the support yoke depending on the wear occurring in the steering system. However, an exact axial adjustment by a rotational movement of the first adjustment member is hardly possible because of the considerable axial preload acting on the first adjustment member. To generate a screwing movement of the first adjustment member at all, an expensive torsional spring providing a high torsional moment is necessary. This leads to a rather complex assembly of the provided adjustable rack bearing.

BRIEF SUMMARY OF THE INVENTION

Therefore, it is a feature of the present invention to provide an apparatus for pressing a rack against the pinion of a steering gear assembly, the apparatus providing a simple construction and assembly as well as a substantially constant axial pressure force and a proper "automatic" wear compensation in the steering gear assembly.

The present invention provides an apparatus for pressing a rack against a pinion of a steering gear assembly, the apparatus comprising housing, a support yoke slidably guided in the housing along an axis, a bearing element that is fixed to the housing in an axial direction, a first elastic element providing an axial load acting upon the support yoke and the bearing element to urge the support yoke against the rack, a wear-compensating abutment member coasting with the bearing element such that a relative rotation about the axis generates an axial displacement of the abutment member relative to the bearing element, and a separate, second elastic element providing a load acting upon the abutment member in a circumferential direction to urge the abutment member against the support yoke. The invention is based on the concept of generating the axial force of the axially adjustable abutment member acting upon the support yoke, exclusively by the separate, second elastic element which is therefore independent of the axial load of the first elastic element. In other words, the second elastic element provides a parallel flow of forces to urge the abutment member against the support yoke. Accordingly, a desired axial pressure force can be generated by the first elastic element in order to push the support yoke against the rack without acting upon the wear-compensating abutment member so that this member can be adjusted easier and more precisely.

Preferably, the second elastic element acts upon the abutment member on the one hand and upon the bearing element or the housing on the other hand. In this case, the bearing element or the housing provides a fixed bearing whereas the abutment member can be rotated such that it approaches the support yoke.

In an advantageous embodiment, a rod portion of the abutment member has a male or external screw thread engaging a corresponding female or internal screw thread of the bearing element.

Similarly, the bearing element can have a male screw thread engaging a corresponding female screw thread of the housing.

In this context, it is preferred that a left-handed thread is formed between the bearing element and the abutment member and a right-handed thread is formed between the bearing element and the housing or vice versa. Especially in case the second elastic element acts upon the abutment member and the bearing element, there is no danger that the bearing element gets loose due to the impact of the second elastic element. Because of the oppositely wound screws, the second elastic element urges both, the bearing element and the abutment member towards the support yoke. However, the effect of the second elastic element urging the bearing element towards the support yoke is usually significantly lower in view of the axial load generated by the first elastic element.

In a further embodiment of the apparatus, the axial load of the first elastic element is greater, preferably significantly greater than an axial load of the abutment member generated by the second elastic element. The desired axial load pushing the support yoke towards the rack is therefore mainly dependent on the first elastic element. The main function of the second elastic element is not the provision of the overall required axial load but the accurate (axial) adjustability of the wear-compensating abutment member and the provision of a desired operating clearance. Preferably, the proportion of the axial load generated by the first elastic element and the axial load generated by the second elastic element is such that the axial load generated by the second elastic element can be neglected.

In a preferred embodiment of the apparatus, there is a resilient spacer arranged between the support yoke and the abutment member. This resilient spacer defines a desired clearance allowing the support yoke to move in response to dimensional variations in the rack and pinion during operation of the steering gear assembly.

In this embodiment, the resilient spacer preferably provides a predefined clearance between the support yoke and the abutment member when acted upon exclusively by a load generated by the second elastic element. The predefined clearance is preferably in the order of 0.05 to 0.15 mm, can be set by design for performances tunability and mainly depends on the following parameters: resiliency of the spacer, preload of the second elastic element, thread pitch between abutment member and bearing element and possibly friction of mating surfaces. Thus, the predefined clearance is easily adaptable by simply modifying at least one of these parameters.

Further, the resilient spacer can be an O-ring arranged at an end wall of the abutment member. In this case, the O-ring is preferably arranged in a groove of this end wall facing the support yoke and axially protrudes from the end wall surface. Alternatively, it is also conceivable that a rubber pad, a washer, a metal spring or the like are used instead of an O-ring.

In a further embodiment of the apparatus, the first elastic element is a coil spring, preferably a cylindrical or tapered compression spring.

The second elastic element can be a clock spring preferably formed as a flat spiral.

Other advantages of this invention will become apparent to those skilled in the art from the following detailed description of the preferred embodiments, when read in light of the accompanying drawings.

BRIEF DESCRIPTION OF THE DRAWINGS

FIG. 2 is a side view of the apparatus according to FIG. 1 in an assembled condition;

FIG. 3 is a bottom view of the apparatus according to FIG. 2;

FIG. 4 is a longitudinal section IV-IV of the apparatus according to FIG. 2;

FIG. 5 is a schematic longitudinal section of an apparatus for pressing a rack against a pinion of a steering gear assembly according to the invention showing a first assembly step;

FIG. 6 is the schematic longitudinal section of the apparatus according to FIG. 5 showing a second assembly step;

FIG. 7 is a schematic longitudinal section of the apparatus according to FIG. 5 showing a third assembly step;

FIG. 8 is a schematic longitudinal section of the apparatus according to FIG. 7 showing an assembled condition;

FIG. 9 is a schematic longitudinal section of the apparatus according to FIG. 8 showing an axial force of the rack due to dimensional variations and meshing separation forces in the rack and pinion during operation of the steering gear assembly;

FIG. 10 is a schematic longitudinal section of the apparatus according to FIG. 7 showing an assembled condition;

FIG. 11 is a schematic longitudinal section of the apparatus according to FIG. 10 showing a hypothetical condition of unadjusted liner wear; and FIG. 12 is a schematic longitudinal section of the apparatus according to FIG. 11 showing a condition of automatically compensated liner wear.

DETAILED DESCRIPTION OF THE INVENTION

Figure 1:
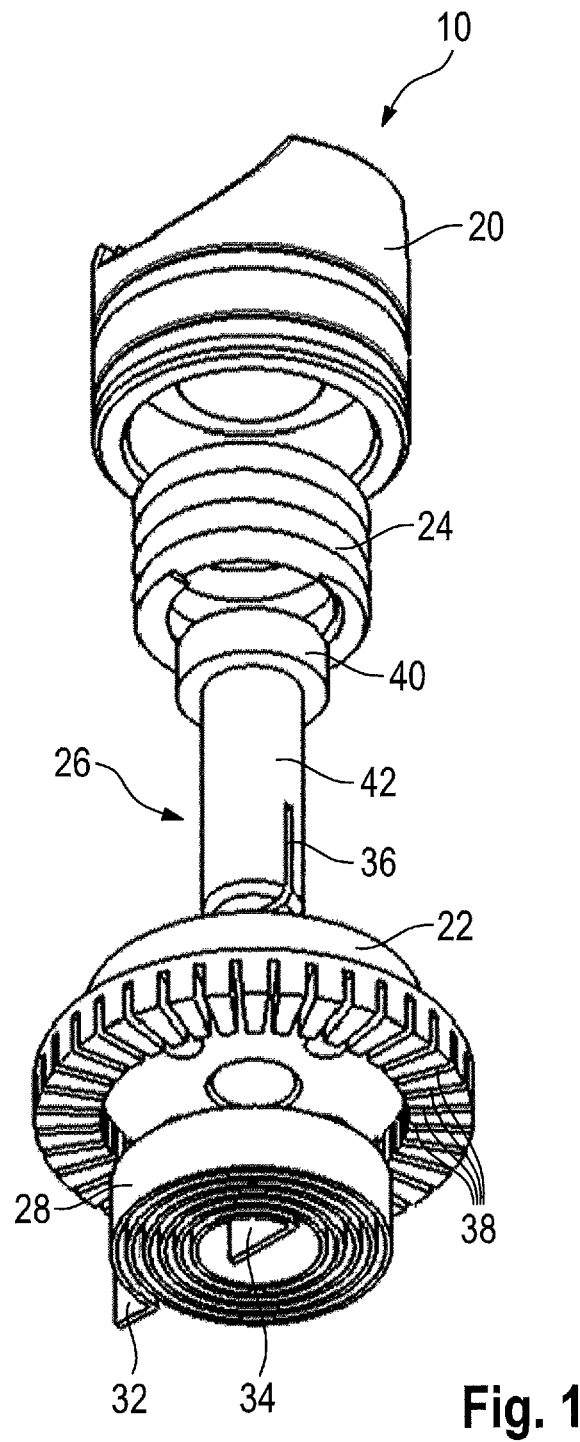
FIG. 1 is a perspective exploded view of an apparatus for pressing a rack against a pinion of a steering gear assembly according to the invention.

FIG. 1 to 4 generally show one embodiment of an apparatus 10 for pressing a rack 12 against a pinion 14 of a steering gear assembly 16 (cf. FIGS. 5 to 12) in accordance with the present invention. The apparatus 10 includes a housing 18 in which the support yoke 20 is slidably guided along an axis A. Further, a bearing element 22 is provided which is fixed to the housing 18 in an axial direction. A first elastic element 24 is provided which generates an axial load $F_A$ (cf. FIG. 6) acting upon the support yoke 20 and the bearing element 22 to urge the support yoke 20 against the rack 12. A wear-compensating abutment member 26 is threadingly engaged with the bearing element 22, and a separate, second elastic element 28 provides a load $F_C$ (cf. FIGS. 6, 7 and 12) acting on the abutment member 26 in a circumferential direction 30 to urge the abutment member 26 against the support yoke 20.

In the present example of apparatus 10, the first elastic element 24 is a coil spring, more precisely a cylindrical compression spring as can be seen best in FIGS. 1 and 4. By contrast, the second elastic element 28 of the shown exemplary embodiment is a clock spring formed as a flat spiral as can be seen best in FIGS. 1 and 3.

As can be seen in FIG. 3, the second elastic element 28 acts upon the abutment member 26 on the one hand and upon the bearing element 22 on the other hand. Instead of the bearing element 22, the second elastic element 28 could also act upon the housing 18, the bearing element 22 or the housing 18 having the main function of providing a fixed support for one end 32 of the clock spring. The other end 34 of the clock spring is fixed to the abutment member 26. In an assembled condition of the apparatus 10, the second elastic element 28 is preloaded such that it screws or tries to screw the abutment member 26 towards the support yoke 20.

The ends 32, 34 of the clock spring representing the second elastic element 28, extend in a radial direction, the inner end 34 engaging a slot 36 at an axial end of the abutment member 26. The outer end 32 of the clock spring engages a radial slot 38 provided at an axial end of a bearing element 22 (cf. FIGS. 1 and 3).

In order to be able to adapt the preload of the second elastic element 28, the axial end of the bearing element 22 provides a variety of radial slots 38 evenly distributed over its entire circumference.

Regarding the attachment of the second elastic element 28 to the abutment member 26 and to the bearing element 22, it is to be noted that instead of slots 36, 38 several other methods could be applied, like pinning, shaping profile interfaces (square end of rod for example).

Due to its preload, the second elastic element 28 provides the circumferential spring load $F_C$ to the abutment member

26. This circumferential spring load $F_C$ is transmitted into an axial load $F_A^*$ because of the threaded connection between the abutment member 26 and the bearing element 22.

However, the axial spring load $F_A$ of the coil spring representing the first elastic element 24 is greater, preferably at least five times greater and even more preferably at least ten times greater than the axial load $F_A^*$ of the abutment member 26 generated by the second elastic element 28. Preferably, the axial load provided by the abutment member 26 is significantly lower than the axial spring load of the coil spring. Depending from the particular construction, the axial spring load is at least twice the force provided by the first elastic element 24. It is however preferred that the ratio of the axial loads is 10:1 or even greater.

The abutment member 26 is formed as a plunger having a flange portion 40 facing towards the support yoke 20 and a rod portion 42 extending through the bearing element 22. The rod portion 42 of the abutment member 26 has a male screw thread 44 engaging a corresponding female screw thread 46 of the bearing element 22.

The bearing element 22 however has also a male screw thread 48 engaging a corresponding female screw thread 50 of the housing 18. The bearing element 22 and the housing 18 are fixed to one another in an axial direction by these threads 48, 50, wherein the fixed axial position is adjustable such that the first elastic element 24 provides a desired axial preload $F_A$ between the support yoke 20 and the bearing element 22.

In order to prevent the bearing element 22 getting undesirably unscrewed in case the second elastic element 28 acts upon the bearing element 22 in a circumferential direction 30, preferably the thread between the bearing element 22 and the abutment member 26 is a left-handed thread and the thread between the bearing element 22 and the housing 18 is a right-handed thread or vice versa. With these threads having an opposite winding, the circumferential spring load $F_C$ urges the abutment member 26 and also the bearing element 22 in a direction towards the support yoke 20. However, because frictional effects and the great axial spring load $F_A$ of the first elastic element 24, this "tightening-effect" of the bearing element 22 by the second elastic element 28 can usually be neglected.

In alternative embodiments, the thread between the bearing element 22 and the abutment member 26 as well as the thread between the bearing element 22 and the housing 18 can both be right-handed or left-handed threads.

If needed, the desired position of the thread between the bearing element 22 and the housing 18 can also be fixed by self retaining methods like gluing or caulking.

As can be seen best in FIG. 4, a resilient spacer 52 is arranged between the support yoke 20 and the abutment member 26. In the present embodiment, the resilient spacer 52 is an O-ring attached to an axial end wall 54 of the abutment member 26. More precisely, a circumferential groove 56 is provided in the end wall 54 of the flange portion 40, wherein the O-ring is arranged in this groove 56 and axially protrudes from the end wall 54 facing the support yoke 20. Instead of an O-ring it would also be possible to apply a rubber pad, a washer, a metal spring or any other element which offers a certain compressibility or elasticity in an axial direction.

The resilient spacer 52 ensures a certain axial mobility of the support yoke 20 in response to dimensional variations or tolerance in the rack 12 and pinion 14 during operation of the steering gear assembly 16.

Preferably, the resilient spacer 52 provides a predefined clearance d between the support yoke 20 and the abutment member 26 when acted upon exclusively by the axial load $F_A^*$ generated by the second elastic element 28. This predefined clearance d is preferably in the order of 0.05 to 0.15 mm and depends on a resilience of the spacer 52, a thread pitch between the abutment member 26 and the bearing element 22 and a preload of the second elastic element 28. These parameters allow the clearance d to be easily and properly adjusted.

Optionally, the apparatus 10 includes a covering cap 57 indicated in dashed lines in FIG. 4. The covering cap 57 can be fixed to the housing 18 or the bearing element 22 in order to protect the second elastic element 28 and the threaded connections inside the housing 18.

FIGS. 5 to 7 show a preferred assembly method of the apparatus 10 for pressing the rack 12 against the pinion 14 of a steering gear assembly 16.

Initially, the components of the apparatus 10 are arranged as shown in FIG. 5. Then, the bearing element 22 (together with the abutment member 26) is screwed into the housing 18 until a predefined axial preload $F_A$ of the first elastic element 24 is attained (cf. FIG. 6).

Once the spring preload $F_A$ of the first elastic element 24 is attained, the second elastic element 28 gets loaded until a given angle and torque preload $F_C$ is attained. After preloading the second elastic element 28, its ends 32, 34 are fixed to the abutment member 26 and the bearing element 22, respectively, as schematically shown in FIG. 6.

When the second elastic element 28 freely acts on the abutment member 26, the second elastic element 28 makes the abutment member 26 rotate and advance towards the support yoke 20 until the resilient spacer 52 of the abutment member 26 gets in contact with an end wall of the support yoke 20 (FIG. 7). The abutment member 26 thereby axially advances about a distance $d_{Advance}$ until the predefined clearance d between the support yoke 20 and the abutment member 26 is attained.

FIGS. 8 and 9 show the axial mobility of the support yoke 20 in case of increased axial loads due to dimensional variations in the rack 12 and pinion 14 and/or due to mesh separation forces during operation of the steering gear assembly 16. In case of such an increased force $F_{Increase}$, the resilient spacer 52 is compressed into groove 56 such that the support yoke 20 abuts on the abutment member 26 (cf. FIG. 9).

FIGS. 10 to 12 disclose a "self-adjustment" of the abutment member 26 to compensate wear in the steering gear assembly 16.

FIG. 10 illustrates the initial situation with a new apparatus 10 for pressing the rack 12 against the pinion 14 of the steering gear assembly 16.

FIG. 11 shows the situation after abrasive wear of a liner 58 of the steering gear assembly 16 occurred. As the first elastic element 24 still pushes the support yoke 20 axially towards the rack 12, the support yoke 20 axially moves about a distance $d_{Wear}$ towards the rack 12.

The undesired increased clearance $d + d_{Wear}$ between the support yoke 20 and the abutment member 26 will be prevented by an axial adjustment of the abutment member 26 due to the circumferential spring load $F_C$ of the second elastic element 28.

The situation shown in FIG. 11 is hypothetic and will never occur in practice. In case of wear, the second elastic element 28 will immediately turn the abutment member 26 in the circumferential direction 30 until a "wear-compensated" axial position is reached. In this wear-compensated position according to FIG. 12, the desired clearance d is maintained.

The apparatus 10 for pressing the rack 12 against the pinion 14 provides the technical advantage that the axial force $F_A^*$ of the axially adjustable abutment member 26 acting upon the support yoke 20 is exclusively generated by the separate, second elastic element 28 and is therefore independent of the axial load $F_A$ of the first elastic element 24. In other words, the second elastic element 28 provides a parallel flow of forces to urge the abutment member 26 against the support yoke 20. Accordingly, a desired axial pressure force $F_A$ can be generated by the first elastic element 24 in order to push the support yoke 20 against the rack 12 without acting upon the wear-compensating abutment member 26 so that this member 26 can be adjusted easier and more precisely.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit scope.

The invention claimed is:

1. An apparatus for pressing a rack against a pinion of a steering gear assembly comprising:
    a housing;
    a support yoke slidably guided in the housing along an axis;
    a bearing element that is fixed to the housing in an axial direction;
    a first elastic element providing an axial load acting upon the support yoke and the bearing element to urge the support yoke against the rack;
    a wear-compensating abutment member coacting with the bearing element such that a relative rotation about the axis generates an axial displacement of the abutment member relative to the bearing element; and
    a separate, second elastic element providing a load acting upon the abutment member in a circumferential direction to urge the abutment member against the support yoke;
    wherein the abutment member is threadingly engaged with the bearing element; and
    wherein the bearing element has a male screw thread engaging a corresponding female screw thread of the housing; and
    wherein a left-handed thread is formed between the bearing element and the abutment member and a right-handed thread is formed between the bearing element and the housing or vice versa.

2. The apparatus according to claim 1, wherein the second elastic element acts upon the abutment member on the one hand and upon the bearing element or the housing on the other hand.

3. The apparatus according to claim 1, wherein a rod portion of the abutment member has a male screw thread engaging a corresponding female screw thread of the bearing element.

4. The apparatus according to claim 1, wherein the axial load of the first elastic element is greater than an axial load of the abutment member generated by the second elastic element.

5. The apparatus according to claim 1, wherein a resilient spacer is arranged between the support yoke and the abutment member.

6. The apparatus according to claim 5, wherein the resilient spacer provides a predefined clearance between the support yoke and the abutment member when acted upon exclusively by the load generated by the second elastic element.

7. The apparatus according to claim 5, wherein the resilient spacer is an O-ring attached to an end wall of the abutment member.

8. The apparatus according to claim 1, wherein the first elastic element is a coil spring.

9. The apparatus according to claim 1, wherein the second elastic element is a clock spring.

* * * * *